US 6,650,279 B2

(12) United States Patent
Jensen et al.

(10) Patent No.: US 6,650,279 B2
(45) Date of Patent: Nov. 18, 2003

(54) METHOD AND APPARATUS FOR NON-COHERENT NAVIGATION USING LOW FRAME RATE TELEMETRY

(75) Inventors: James R. Jensen, Columbia, MD (US); Matthew J. Reinhart, Crownsville, MD (US); Karl B. Fielhauer, Clarksville, MD (US); John E. Penn, Eldersburg, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/221,604

(22) PCT Filed: Feb. 4, 2002

(86) PCT No.: PCT/US02/03234
§ 371 (c)(1),
(2), (4) Date: Sep. 12, 2002

(87) PCT Pub. No.: WO02/065152
PCT Pub. Date: Aug. 22, 2002

(65) Prior Publication Data
US 2003/0090410 A1 May 15, 2003

Related U.S. Application Data

(60) Provisional application No. 60/267,691, filed on Feb. 9, 2001.

(51) Int. Cl.$^7$ .............................................. G01S 13/58
(52) U.S. Cl. ..................... 342/104; 342/115; 342/195; 342/175
(58) Field of Search ................. 342/104, 115, 342/174, 175, 195, 50

(56) References Cited

U.S. PATENT DOCUMENTS

| 5,745,072 A | 4/1998 | Jensen et al. ............... 342/104 |
| 5,995,039 A | 11/1999 | Jensen et al. ............... 342/104 |
| 2002/0090410 A1 * | 7/2002 | Jensen et al. ............... 342/104 |

OTHER PUBLICATIONS

"Accurate Doppler navigation with a simple spacecraft transceiver", Jensen, J.R.; Bokulic, R.S.; Aerospace Conference, 1999. Proceedings. 1999 IEEE , Mar. 6–13, 1999 pp. 245–254 vol. 2.*

"Highly accurate, noncoherent technique for spacecraft Doppler tracking", Jensen, J.R.; Bokulic, R.S.; Aerospace and Electronic Systems, IEEE Transactions on , vol. 35 Issue: 3, Jul. 1999 pp. 963–973.*

* cited by examiner

Primary Examiner—John B. Sotomayor
(74) Attorney, Agent, or Firm—Albert J. Fasulo, II

(57) ABSTRACT

A method and apparatus for obtaining measurements, on a spacecraft that employs a transceiver, at intervals that are shorter than the telemetry frame duration for use in correcting ground-based Doppler measurements so as to remove the effects of drift in the spacecraft oscillator frequency reference. Samples of navigation counters on the spacecraft that supply information that may be used to compare the uplink frequency with the downlink frequency at the spacecraft are triggered at intervals that are shorter than the duration of a telemetry frame; the samples are then included in a telemetry frame and are time tagged after they are received on the ground; the time tagged samples are then used to calculate precise two-way Doppler measurements.

13 Claims, 1 Drawing Sheet

METHOD AND APPARATUS FOR NON-COHERENT NAVIGATION USING LOW FRAME RATE TELEMETRY

CROSS-REFERENCE TO RELATED APPLICATION

This application claims the benefit of the U.S. Provisional Application No. 60/267,691, filed on Feb. 9, 2001.

BACKGROUND OF THE INVENTION

1. Field of the Invention

The present invention relates to spacecraft Doppler tracking with a transceiver and, more specifically, is a method and apparatus for obtaining measurements on a spacecraft at intervals that are shorter than the telemetry frame duration and that may be precisely time tagged on the ground and used in the determination of precise two-way Doppler measurements.

2. Description of the Related Art

In conventional two-way spacecraft navigation, an uplink carrier is transmitted from a ground station at a given frequency. The uplink frequency is stabilized by a complex hydrogen-maser-based frequency standard. The frequency received by a coherent spacecraft transponder is then multiplied by a known factor and a downlink carrier is transmitted at the product frequency. This technique ensures that the downlink frequency maintains the high stability of the uplink frequency. The uplink and downlink frequencies are Doppler-shifted by the relative motion between the spacecraft and the ground station. However, because the frequency transmitted from the ground station and the multiplication factor applied to the received signal at the spacecraft are known, the Doppler component of the signal received from the spacecraft, and thus the relative velocity of the spacecraft, can be calculated. Such coherent Doppler tracking can be done to a high degree of accuracy assuming that the ground station frequency standard is highly stable over the round-trip propagation time.

Unfortunately, transponders on spacecraft utilizing coherent tracking are typically heavy and expensive. Furthermore, the coherency requirement is a barrier to revolutionary changes in transponder design required by the present-day emphasis on smaller, lower cost spacecraft missions. These considerations make the use of a transceiver attractive. A transceiver generates the downlink carrier frequency independent of the uplink carrier frequency. Such a system is "noncoherent" because no fixed phase relationship exists between the uplink and downlink signals at the spacecraft.

When using a transceiver, the spacecraft carries a low-mass oscillator for use as a reference in generating its downlink frequency. Such spacecraft oscillators are inherently less stable however than their ground-based counterparts and are subject to significant drift errors due primarily to crystal aging and to the large temperature fluctuations found in space. The instability of the spacecraft oscillators can result in significant errors in the spacecraft velocity measurements. Therefore, a correction must be made to the Doppler frequency measured on the ground. Early ideas for reliable noncoherent spacecraft navigation were limited or required significant changes to ground station equipment to support special downlink signaling formats designed to cancel spacecraft oscillator drift.

U.S. Pat. No. 5,745,072, incorporated by reference herein, discloses a method and apparatus for two-way noncoherent measurement of spacecraft velocity that provides cancellation of oscillator drift effects and is compatible with existing ground station equipment. The '072 patent discloses a method of two-way, noncoherent Doppler tracking wherein the uplink and downlink signals are compared within the spacecraft by periodically sampling the values held by two counters that are included in the spacecraft hardware for this purpose. This comparison is used to correct the Doppler measurement made on the ground to determine the velocity of the spacecraft. Advantages of the invention disclosed in the '072 patent include the fact that no changes are required to ground station hardware, that an ultra-stable oscillator is not necessarily required on the spacecraft, that two-way tracking noise is eliminated, and that the spacecraft oscillator drift can be characterized during flight.

A second patent, U.S. Pat. No. 5,995,039, incorporated by reference herein, discloses a method of time-tagging two-way, noncoherent Doppler measurements when the measurements are made at the rate of once per telemetry frame. The '039 patent discloses the addition of logic that uses a signal that is synchronous with the telemetry frame timing to trigger the sampling of the values of the two counters. The counters are used to compare the uplink frequency observed at the spacecraft with the on-board frequency reference used to generate the downlink signal.

According to the '039 patent, the uplink carrier is down-converted in the receiver and used to provide a signal that is the clock of the first counter. A multiple of the on-board frequency reference is used to provide the clock signal for the second counter. Both counters are reset to zero at the start of a given downlink telemetry frame and are free running thereafter. Following the start of each telemetry frame, both counter values are latched, using first and second latches, on the next clocking edge of the first counter's clock. The latched values are then put into the telemetry for use on the ground. Because it is a noncoherent system, the change in phase of the signal received on the ground will differ from what would occur with the use of a coherent system. However, the counters provide a means to compare the phase change actually measured on the ground to the phase change that would have been observed using a coherent system. The system is therefore potentially as accurate as two-way coherent Doppler tracking.

The method described in the '039 patent is not suitable to the achievement of precise Doppler velocity measurements when the telemetry data rate becomes very low and the time between the start of successive telemetry frames becomes very long. Such infrequent measurements result in large interpolation errors in the ground processing. Interpolations are necessary because the intervals over which measurements are made on the spacecraft do not coincide with the intervals over which measurements are made on the ground. For example, in one particular spacecraft the navigation data as contained in the secondary header of a telemetry frame would be updated at the DSN (NASA's Deep Space Network) every 13 minutes. That is too infrequent to adequately interpolate and correlate with ground-based measurements made every 0.1 to 1.0 seconds.

There is therefore a need for providing two-way, noncoherent spacecraft Doppler measurements at a rate that is greater than the telemetry frame rate, and in such a way that the measurements can be accurately time-tagged and reliably used on the ground.

SUMMARY OF THE INVENTION

The present invention is directed to a method and apparatus for providing two-way, noncoherent spacecraft Doppler measurements at a rate that is greater than the telemetry frame rate. The invention is particularly useful in deep space flight missions or in other applications where the update of navigation counters may be required to be at a rate greater than the telemetry frame rate.

According to the present invention, samples of navigation counters are triggered on a spacecraft that employs a transceiver at intervals that are shorter than the duration of a telemetry frame; the samples are then included in a telemetry frame and are time tagged after they are received on the ground; finally, the time tagged samples are used to calculate precise two-way Doppler measurements.

DESCRIPTION OF THE PREFERRED EMBODIMENT(S)

Figure 1:
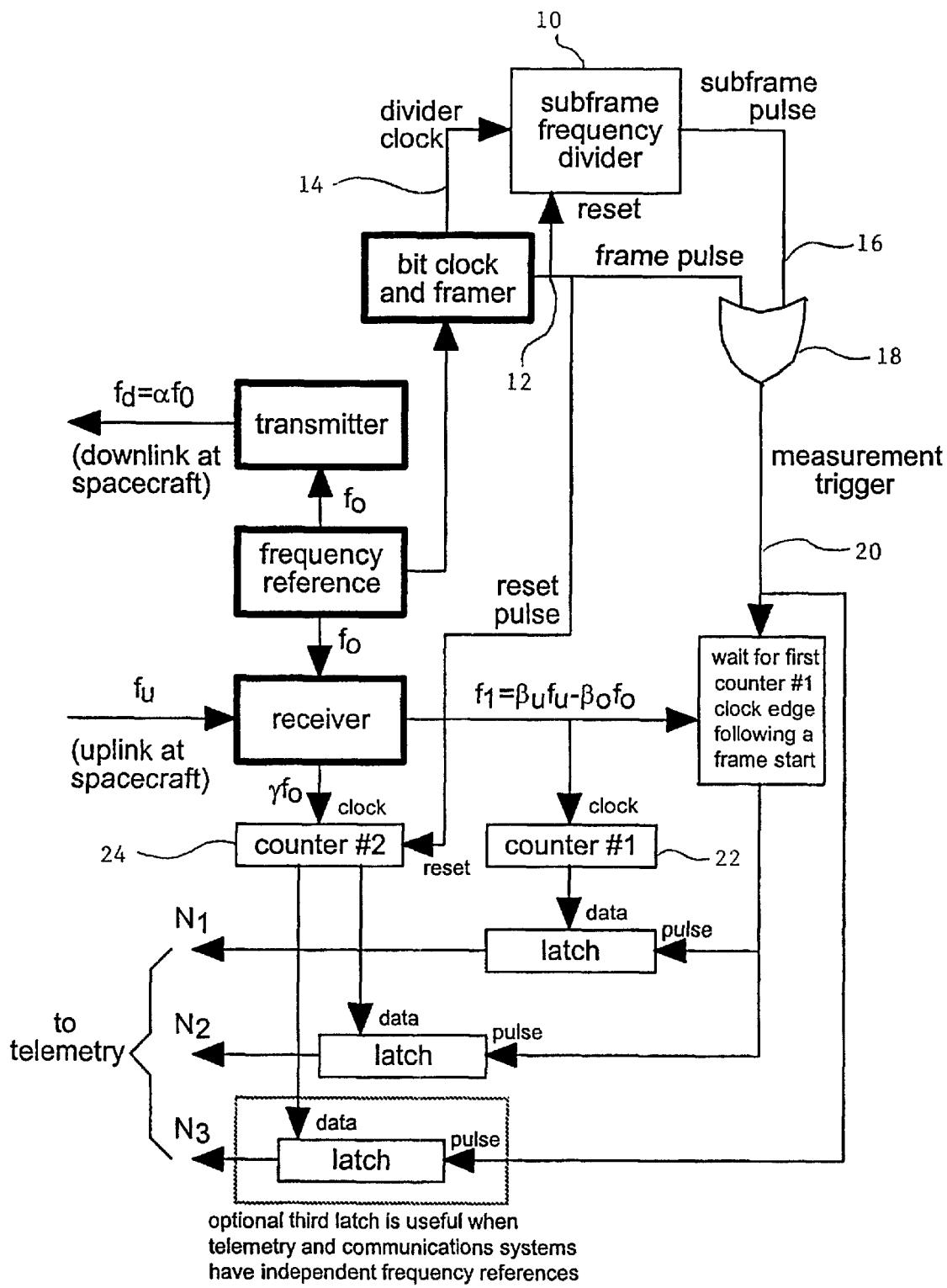
FIG. 1 is a schematic diagram illustrating one embodiment of the present invention.

A general method for creating "subframe measurements" (measurements that occur between telemetry frame starts) is to include hardware that will trigger spacecraft measurements (i.e., latching of the two counters as described above and in U.S. Pat. No. 5,995,039) after a maximum time interval has elapsed, unless a frame start occurs first. One embodiment of such hardware is illustrated in FIG. 1.

The hardware shown in FIG. 1 includes a divider 10 that can be reset by a telemetry frame start input 12. The divider 10 receives a divider clock frequency at a divider input 14 that is synchronous with a clock frequency used to generate the telemetry frames. For example, in one embodiment that is discussed in more detail below, the divider clock frequency is approximately 12.45 Hz and is divided by 74 so that the divider cycle time is approximately 5.94 seconds. A divider output 16 thus receives an output pulse every 5.94 seconds unless the divider 10 is first reset by a telemetry frame start pulse.

The divider output 16 and the telemetry frame start input 12 are operatively connected to a logical OR gate 18 that produces a navigation counter trigger 20. When the time between telemetry frame starts is shorter than the divider cycle time, then the divider 10 is continuously reset and the navigation counter trigger 20 is equal to the telemetry frame start input 12. In such a case the additional hardware of the divider 10 and the OR gate 18 will have no effect on the operation of a noncoherent navigation system because the divider 10 will be reset before it can complete a cycle. When the time between telemetry frame starts is longer than the divider cycle time, the navigation counter trigger 20 will generate measurements from two counters 22, 24 on the spacecraft at intervals that do not significantly exceed the divider cycle time. (The measurement intervals may exceed the divider cycle time by up to one cycle of the clock of Counter #1 22.)

The divider clock frequency of 12.45 Hz mentioned above is used here for illustration only and, of course, other values may be used. The divider clock frequency should generally be synchronous with the clock signal used to generate the telemetry frames such that the divider output 16 includes an integer number of "fill in" pulses between the telemetry frame start pulses. However no particular phasing of the divider clock frequency and the clock frequency used to generate the telemetry frames is assumed.

The divider 10 value of 74 is also used here for illustration only and other values may be used. The value of 74 is shown here because it was found during numerical simulations of one particular spacecraft that measurements generated at a rate of at least once every 5.94 seconds produced accurate Doppler velocity measurements and because this value maximized the separation of the triggering of subframe measurements and the triggering of measurements by telemetry frame starts.

The example hardware shown in FIG. 1 will generate measurements on the spacecraft that are frequent enough to provide accurate Doppler velocities because it guarantees that the measurements made on the spacecraft are closely enough spaced in time that interpolation errors are small enough to be at an acceptable level. The frequency at which these measurements must be generated will depend on the particular spacecraft mission dynamics and on the overall system requirements. But whatever the necessary measurement frequency is, the hardware shown in FIG. 1 can be configured to meet those requirements through an appropriate combination of the divider clock frequency and the divider value.

Other hardware and software configurations that generate measurement triggers at a minimum rate, regardless of the telemetry frame rate, would also meet the noncoherent navigation method requirements of the present invention. The hardware shown in FIG. 1 is attractive in part because it serves the required purpose without the need for any additional information such as the current frame rate in situations where any one of several frame rates may be employed at a given time. Also, the divider clock frequency and the divider value can remain fixed at all frame rates.

Additional optional features may also be employed in the practice of the present invention. A first feature is a means of associating each measurement that is triggered during a particular telemetry frame with that particular telemetry frame. This may be accomplished by hardware on a downlink card that places a measurement pair into a secondary frame header of each telemetry frame as the frame is being assembled for transmission. The measurements found in the secondary frame header therefore have a known temporal relationship with the start of the frame in which they are found, without concern for variable latency in the spacecraft data handling system. Other possible methods for associating telemetered measurements with the frame start that triggered them include: the attachment of a spacecraft time with the telemetered measurements at the time that these measurements are made and inclusion of this time in the telemetry along with the measurements themselves, provided that each frame includes a unique spacecraft time reference; attachment of a telemetry frame number to each measurement at the time that the measurement is made and inclusion of this frame number in the telemetry along with the measurements themselves; or another method of associating a value that is unique to each telemetry frame with the measurements that are triggered by that frame.

A second optional feature of the present invention is a means for including in the downlinked telemetry all of the noncoherent navigation measurements. For example, in one particular embodiment this is achieved by the Command and Data Handling (C&DH) system which obtains the noncoherent measurements from the downlink card at a rate of once per second (the housekeeping data collection rate), retaining every fifth measurement, and including these values in telemetry data packets designed for this purpose. The inclusion of these data into the telemetry is performed by the spacecraft as directed by ground command. In this way, the spacecraft measurements triggered by telemetry frame starts and by subframe pulses are recovered on the ground for processing. Other methods of including these measurements in the telemetry would also be sufficient so long as the order of the measurements is preserved or can be reconstructed.

As discussed above, U.S. Pat. No. 5,995,039 discloses a method for accurately time-tagging spacecraft measurements so that they may be used in the calculation of accurate Doppler velocities when combined with ground-based measurements. The telemetry consists of pairs of counter values. These are not tagged in the telemetry with a time that may be applied in the ground processing. Rather, post-telemetry time-tagging is employed to associate a precise time with each of the counter pairs.

The method for accurately time-tagging spacecraft measurements using low frame rate telemetry described here is applicable in applications of the noncoherent navigation method described in the '039 patent in which the downlink carrier frequency is coherent with the clock signal provided to Counter #2 24. This will be the case when a single frequency reference is used onboard the spacecraft by both the telemetry system and the transceiver hardware.

The ground portion of the Doppler velocity determination produces an accurate measurement of the downlink carrier frequency. It is this measurement that is processed with the aid of the telemetered spacecraft measurements to produce an accurate final Doppler velocity. Because of the coherence of the clock of Counter #2 24 and the downlink carrier frequency, the time separation of two values of the Counter #2 24 may be computed from the difference of those values. Because only the least significant bits of the counter values are telemetered to the ground, an algorithm is required to restore the more significant bits of the counter values. One embodiment of such an algorithm includes the following steps:

1) The spacecraft measurements (i.e., sampled counter values) are recovered from the secondary frame headers of the telemetry and tagged with the ground receipt time for the frames in which they are found. The ground receipt time is obtained from the frame synchronizer that is a normal part of the ground station equipment.

2) The spacecraft measurements are recovered from telemetry data packets.

3) A cross comparison of the two sets of measurements determines those measurements in the data packets that are also included in the secondary frame headers.

4) The counter values are "unrolled" to restore the more significant bits that are not included in the telemetry. Counter #2 24 may roll over several times between successive measurements, depending on the measurement rate, the clock frequency, and the number of bits included in the telemetry. Because the present invention proposes a system in which the measurements are triggered by signals that are coherent with the Counter #2 clock, the number of times that this counter rolls over between the 1st and 2nd, the 2nd and 3rd, the 3rd and 4th, etc., subframe measurements is known by consideration of the hardware. This knowledge can be used to unroll the counter values by adding multiples of the counter roll-over value (e.g., the counter roll-over value is 65536 for the 16-bit counters used in one particular spacecraft implementation). Because the divider clock frequency is not assumed to have a fixed phase relationship with the start of telemetry frames, the number of times that Counter #2 24 rolls over between the frame start and the first subframe measurement is not known from a consideration of the hardware. However, that number may be determined by an observation of the relative clock frequencies of the two counters and the change in the value of Counter #1 22 over that interval. The relative clock frequency can be observed either over the interval between the 1st and 2nd subframe measurements, when two or more measurements are made between the frame starts, or over the entire frame, because the total number of times that Counter #2 24 rolls over during a telemetry frame is known from a consideration of the hardware. The former method is preferable because the ratio of the clock frequencies will change with the spacecraft dynamics, and the use of a reference value closer to the target interval will be more accurate than the use of the entire frame when the frame times are large. The unrolling of the values of Counter #2 24 makes use of the unrolled values of Counter #1 22. In software developed for the embodiment discussed above, where the counter roll-over value is 65536, the Counter #1 values are easily "unrolled" because that counter is sampled at least twice during the time that is required to roll over once. The 16-bit values may be unrolled simply by adding the smallest multiple of 65536 that is required to make the sequence of values monotonically increasing.

5) Finally, the complete set of measurement pairs is time tagged in an iterative process. First, an approximate value of Counter #2 24 is assigned to the start of one downlink carrier frequency measurement interval. From this value and the coherence of the downlink carrier frequency, a time may be computed for each measurement pair because all differences in the values of Counter #2 24 can be converted to time differences through downlink carrier measurements and consideration of the spacecraft hardware. The computed times for all measurements that were triggered by telemetry frame starts is then compared to the observed ground receipt times for those frames. If a bias is observed in this comparison, then the value of Counter #2 24 assigned to the one downlink carrier frequency measurement interval that was chosen as a reference point above is appropriately adjusted. The process is repeated until no bias between the observed and computed frame starts is present. The comparison of the observed and computed frame start times includes consideration of the time lapse between the triggering of the measurement (which is the result of the frame start) and the actual measurement itself (which is the result of the next clocking edge of Counter #1 22 that follows the trigger).

The above algorithm produces an accurate time tag for all measurement pairs, including those that were triggered between the frame starts where no frame synchronizer is available. Following the accurate time tagging of all measurement pairs, the measurements may be used to correct the observed downlink carrier frequencies in a manner disclosed in U.S. Pat. No. 's 5,745,072 and 5,995,039 covering the noncoherent navigation method.

The above therefore discloses the concept, hardware, and software that permits accurate and time-tagged, two-way noncoherent Doppler measurements to be made with a transceiver system at all data rates, including those rates at which the measurement interval must be shorter than the telemetry frame duration. Alterations, modifications, and improvements concerning various spacecraft applications will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for obtaining two-way Doppler measurements with a transceiver comprising the steps of:
   triggering samples of navigation counters on a spacecraft at intervals that are shorter than the duration of a telemetry frame;
   including said samples in a telemetry frame;
   time tagging said samples on the ground; and
   correcting two-way Doppler measurements made on the ground using said time tagged samples.

2. A method for obtaining measurements on a spacecraft at intervals that are shorter than the telemetry frame duration and that may be precisely time tagged on the ground and used in the determination of two-way Doppler measurements comprising the steps of:
   including, on-board a spacecraft, a divider clock frequency that is synchronous with a clock frequency used to generate telemetry frames;
   dividing said divider clock frequency to produce a divider cycle time;
   resetting said divider at the start of each telemetry frame;
   producing a divider output at the end of each divider cycle time if the divider cycle time is not first reset by the start of a telemetry frame;
   combining, using a logical OR function, said divider output with a telemetry frame start input to produce a navigation counter trigger;
   employing said navigation counter trigger to enable multiple samples of navigation counter values to be transmitted in a single telemetry frame.

3. The method as recited in claim 2, further comprising the step of associating measurements that are triggered by said navigation counter trigger during a particular telemetry frame with said particular telemetry frame.

4. The method as recited in claim 3, wherein the step of associating measurements comprises the step of recording a pair of said navigation counter values in a secondary frame header of each telemetry frame as each frame is being assembled for transmission.

5. The method as recited in claim 2, further comprising the step of including in a downlinked telemetry all noncoherent navigation measurements, whether triggered by a frame pulse or a subframe pulse.

6. The method as recited in claim 5, wherein the step of including in a downlinked telemetry all noncoherent navigation measurements comprises the step of obtaining noncoherent measurements from a Command and Data Handling (C&DH) system and including said measurements from said C&DH system in telemetry data packets.

7. The method as recited in claim 2, further comprising restoring significant bits of said navigation counter values after said counter values are telemetered to the ground where the significant bits are not included in the telemetry.

8. The method as recited in claim 7, wherein said restoring step comprises the steps of:
   recovering spacecraft measurements from secondary frame headers;
   recovering spacecraft measurements from telemetry data packets;
   comparing said spacecraft measurements recovered from both said secondary frame headers and said data packets to determine which measurements in said data packets are also included in said secondary frame headers;
   assigning each spacecraft measurement to a position within the frame in which the measurement was made;
   unrolling said navigation counter values to restore the more significant bits that are not included in a received telemetry by adding multiples of a value that is characteristic of each counter such that the unrolled navigation counter values continuously increase and do so at a known rate.

9. The method as recited in claim 8, further comprising the step of using a sequence of downlink Doppler measurements to calculate time tags for each spacecraft measurement.

10. An apparatus for obtaining measurements on a spacecraft at intervals that are shorter than the telemetry frame duration and that may be precisely time tagged on the ground and used in the determination of two-way Doppler measurements comprising:
    a divider that receives a divider clock frequency that is synchronous with a clock frequency used to generate telemetry frames;
    a reset, operatively connected to said divider, for resetting said divider at the start of a telemetry frame;
    a logical OR gate for comparing an output of said divider with a telemetry frame start input; and
    navigation counters that are triggered by an output from said OR gate;
    wherein said counters, upon being triggered by said output from said OR gate, produce navigation counter values that are used to compute said Doppler measurements.

11. The apparatus as recited in claim 10, further comprising means for associating measurements that are triggered during a particular telemetry frame with said particular telemetry frame.

12. The apparatus as recited in claim 10, further comprising means for including in a downlinked telemetry all noncoherent navigation measurements.

13. The apparatus as recited in claim 10, further comprising a computer readable medium having stored therein a computer program for restoring significant bits of said navigation counter values after said counter values are telemetered to the ground, the computer program comprising:
    a first code segment which, when executed on a computer, recovers spacecraft measurements from secondary frame headers;
    a second code segment which, when executed on a computer, recovers spacecraft measurements from telemetry data packets;
    a third code segment which, when executed on a computer, compares said spacecraft measurements recovered from both said secondary frame headers and said data packets to determine which measurements in said data packets are also included in said secondary frame headers;
    a fourth code segment which, when executed on a computer, unrolls said navigation counter values to restore the more significant bits that are not included in a received telemetry; and
    a fifth code segment which, when executed on a computer, iteratively calculates time tags for said navigation counter values.

* * * * *

UNITED STATES PATENT AND TRADEMARK OFFICE
CERTIFICATE OF CORRECTION

PATENT NO.    : 6,650,279 B2
DATED         : November 18, 2003
INVENTOR(S)   : Jensen et al.

It is certified that error appears in the above-identified patent and that said Letters Patent is hereby corrected as shown below:

Column 1,
Line 9, insert, immediately before the text "BACKGROUND OF THE INVENTION," the following text:

-- STATEMENT OF GOVERNMENTAL INTEREST

This invention was made with United States Govenrment support under Contract No. NAS5-97271 awarded by the National Aeronautics and Space Administration (NASA). The United States Government has certain rights in the invention. --

Signed and Sealed this

Fifteenth Day of June, 2004

JON W. DUDAS
*Acting Director of the United States Patent and Trademark Office*